(12) United States Patent
Ki

(10) Patent No.: US 9,684,658 B2
(45) Date of Patent: *Jun. 20, 2017

(54) SWAT COMMAND AND API FOR ATOMIC SWAP AND TRIM OF LOGICAL PAGES

(71) Applicant: Samsung Electronics Co., Ltd., Gyeonggi-do (KR)

(72) Inventor: Yang Seok Ki, Palo Alto, CA (US)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/954,885

(22) Filed: Nov. 30, 2015

(65) Prior Publication Data
US 2016/0085796 A1    Mar. 24, 2016

Related U.S. Application Data

(63) Continuation-in-part of application No. 14/282,358, filed on May 20, 2014.

(60) Provisional application No. 61/902,092, filed on Nov. 8, 2013, provisional application No. 62/175,073, filed on Jun. 12, 2015.

(51) Int. Cl.
*G06F 12/00* (2006.01)
*G06F 17/30* (2006.01)
*G06F 3/06* (2006.01)

(52) U.S. Cl.
CPC ...... *G06F 17/30082* (2013.01); *G06F 3/0643* (2013.01); *G06F 17/30091* (2013.01)

(58) Field of Classification Search
CPC ............ G06F 17/30082; G06F 3/0643; G06F 17/30091; G06F 2212/152; G06F 12/10; G06F 2212/7201; G06F 12/1009
See application file for complete search history.

(56) References Cited

U.S. PATENT DOCUMENTS

| 6,366,933 B1 | 4/2002 | Ball |
| 8,495,085 B2 | 7/2013 | Cai |
| 8,515,912 B2 | 8/2013 | Garrod |
| 9,164,700 B2* | 10/2015 | Hutton .................. G06F 3/0607 |
| 2009/0109788 A1* | 4/2009 | Moon .................. G06F 12/0246 |
| | | 365/230.03 |
| 2011/0044099 A1 | 2/2011 | Dieny |

(Continued)

OTHER PUBLICATIONS

Wong, R.K., et al., "Managing and Querying Multi-Version XML Data with Update Logging," School of Computer Science & Engineering, University of New South Wales, Sydney Australia, DocEng '02, Nov. 8-9, McLean, Virginia.

*Primary Examiner* — Ann J Lo
*Assistant Examiner* — Eric Loonan
(74) *Attorney, Agent, or Firm* — Convergent Law Group LLP

(57) ABSTRACT

Example embodiments provide access to an updated file performed by at least one processor, wherein responsive to receiving a first list of logical page numbers (LPNs) and a second list of LPNs for an update, wherein the first list of LPNs is mapped to a first list of physical page numbers (PPNs), and the second list of LPNs is mapped to a second list of PPNs, the method, comprising: atomically remapping the first list of LPNs so that the first list of LPNs is mapped to the second list of PPNs; and trimming a mapping of the first list of LPNs to the first list of PPNs.

14 Claims, 14 Drawing Sheets

(56) References Cited

U.S. PATENT DOCUMENTS

2013/0212151 A1 8/2013 Herbach
2014/0310499 A1 10/2014 Sundararaman

* cited by examiner

SWAT COMMAND AND API FOR ATOMIC SWAP AND TRIM OF LOGICAL PAGES

CROSS-REFERENCE TO RELATED APPLICATIONS

This application is a continuation-in-part of co-pending patent application Ser. No. 14/282,358, filed on May 20, 2014, which claims the benefit of provisional Patent Application Ser. No. 61/902,092, filed Nov. 8, 2013. This application also claims the benefit of provisional Patent Application Ser. No. 62/175,073, filed Jun. 12, 2015. Both are assigned to the assignee of the present application, and incorporated herein by reference.

BACKGROUND

Document management systems update a data structure in order to track the most up-to-date version of documents. In this process, some systems create another version of a document instead of overwriting the older version, and keep the older version of document for a while. This allows the systems to concurrently access the older version of a document for reads while the new version is being updated. For example, if a user updates his/her blog page, other users can still read the old version of blog page while he/she is updating the blog page. At some point, the systems need to update the system information to access the new document and replace the old document. Typically, this triggers a series of cascaded updates in the data structure of the system and necessitates many writes to storage.

Accordingly, it would be desirable to provide an improved method and system for providing access to an updated file without having to perform cascaded updates in the data structures of the system.

BRIEF SUMMARY

Example embodiments provide access to an updated file performed by at least one processor, wherein responsive to receiving a first list of logical page numbers (LPNs) and a second list of LPNs for an update, wherein the first list of LPNs is mapped to a first list of physical page numbers (PPNs), and the second list of LPNs is mapped to a second list of PPNs, the method, comprising: atomically remapping the first list of LPNs so that the first list of LPNs is mapped to the second list of PPNs; and trimming a mapping of the first list of LPNs to the first list of PPNs.

According to the method and system of the example embodiments, a file may be updated without having to perform cascaded updates in the data structures of the system and without unnecessary writes to storage.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
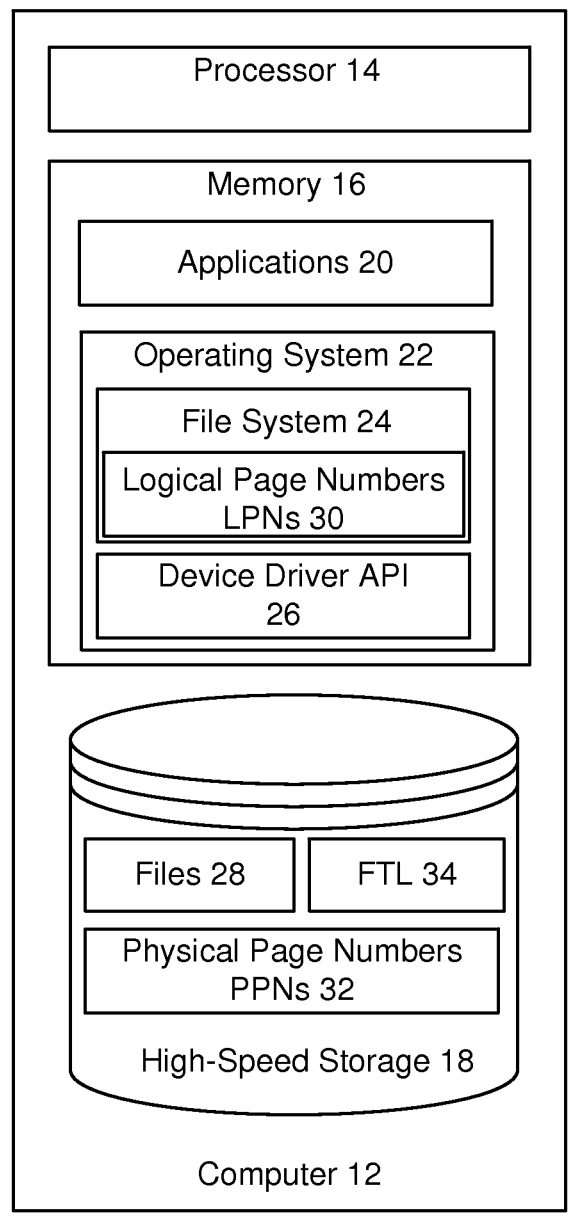
FIG. 1 is a block diagram illustrating a document management system in accordance with the example embodiments.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or example terms provided herein is intended merely to better illuminate the invention and is not a limitation on the scope of the invention unless otherwise specified. Further, unless defined otherwise, all terms defined in generally used dictionaries may not be overly interpreted.

FIG. 1 is a block diagram illustrating a document management system 10 in accordance with the example embodiments. The document management system 10 may comprise a computer 12 that tracks and stores electronic documents or files. In one embodiment, the computer 12 may comprise a desktop, laptop, workstation, or mobile device while in another embodiment, the computer 12 may comprise a server that communicates with a client computer over a network (not shown). The computer 12 may include typical computer components including a processor 14, a memory 16, and a storage device, such as high-speed storage 18 (e.g., solid state drive (SSD)).

The processor 14 may include multiple processors, or a single processor with one or more cores. The processor 14 executes program instructions from memory 16. Example types of software may include applications 20, an operating system 22, a file system 24, and a device driver application programming interface (API) 26 for the high-speed storage 18.

As is well known in the art, the applications 20 may represent computer software that when executed by the processor 14 causes a computer 12 to perform tasks beyond the running of the computer 12. Examples may include a web browser, a word processor and a database program. Typically, the applications 20 create, modify or update files 28. The operating system 22 is system software that manages and controls the operation of the computer 12. Examples may include Microsoft Windows, Mac OS X and Linux.

The file system 24 is software that controls how information, such as the files 28, are stored, retrieved and updated on data storage devices, such as the high-speed storage 18. Some application/file types may uses logical page numbering for specifying where data, such as pages in the files 28, are stored on the high-speed storage 18 or other computer storage devices. More specifically, logical page numbering is an abstraction that assigns logical page numbers (LPNs) 30 to pages in the files 28 that map to specific storage locations on the high speed storage 18.

The device driver application programming interface (API) 26 allows the applications 20, operating system 22, and file system 24 to transparently interact with the high-speed storage 18. The device driver API 26 provides commands to store and/or receive data from high-speed storage 18.

In one embodiment, the high-speed storage 18 uses physical page numbering to provide addresses to pages stored on the high-speed storage 18. These types of addresses may be referred to as physical page numbers (PPNs) 32 that can map to specific storage locations. In one embodiment, the high-speed storage 18 may comprise a solid-state drive (SSD) (also known as a solid-state disk). An SSD is a data storage device that uses integrated circuit assemblies as memory to persistently store data, such as files 28. In one embodiment, the SSD may use NAND-based flash memory, or random-access memory (RAM).

In the embodiment, the high-speed storage 18 may further include a Flash translation layer (FTL) 34 or an equivalent that manages the high-speed storage 18 while providing a logical sector interface to the computer 12. As such, the FTL 34 controls the mapping between the LPNs 30 maintained by the file system 24 and the PPNs 32 maintained by the high-speed storage 18. In an alternative embodiment, the example embodiments may be used with other types of storage devices other than an SSD.

Figure 2:
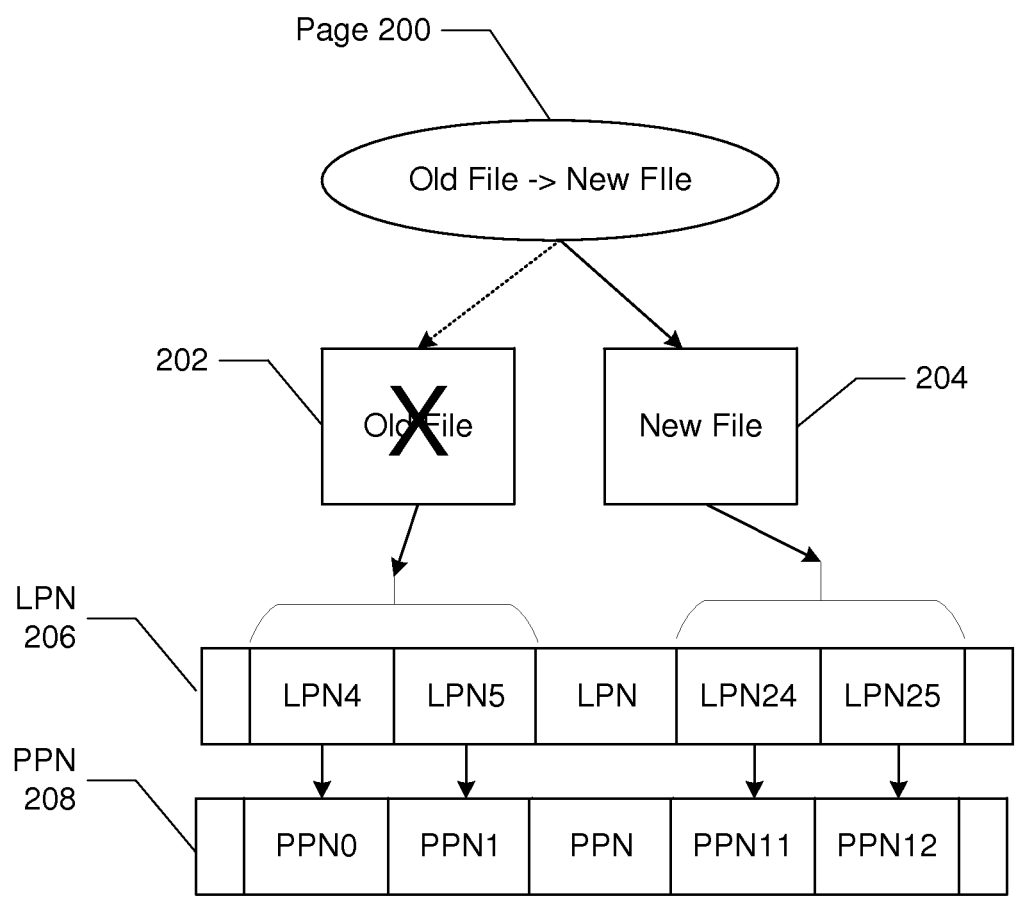
FIG. 2 is a graphical illustration of a conventional document management system updating a file.

FIG. 2 is a graphical illustration of a conventional document management system updating a file. The example shown assumes that an application maintains a file 200 that represents a multipage blog for user. Whenever the user updates the blog, the application reads the file 200 into memory, and modifies the content accordingly. During the update, the system creates a new file 204 into which the modified content is copied. Meanwhile, other users may still access and view the old file 200, while the user continues to update the blog. When the user finishes editing the blog and submits the pages, the application switches to the new file 204 and deletes the old file 202.

The file system maintains the logical page numbers (LPN) 206 for the pages in the old file 202 and the new file 204, while the storage system (where the files are actually stored) maintains physical page numbers (PPN) 208. In this example, the file system maps the pages in the old file 202 to LPN4 and LPN5, while the storage device maps LPN4-LPN5 to PPN0-PPN1, respectively. Similarly, the pages in the new file 204 are mapped to LPN24-LPN25, and LPN24-LPN25 are in turn mapped to PPN11-PPN12, respectively.

One problem with such conventional systems is that at some point the systems need to update system information to access the new file 204 that replaces the old file 202. Typically, this triggers a series of cascaded updates in data structure(s) of system and causes many writes to storage.

The system information may include metadata for each file/document. The metadata may, for example, include the date the document was stored and the identity of the user storing the file. The metadata is typically stored in a data structure. One example of such a data structure is a B-tree, which is a tree data structure that keeps data sorted and allows searches, sequential access, insertions, and deletions in logarithmic time. The list of LPNs 206 and/or metadata for each file 200 may be maintained by a leaf node in the B-tree. There is typically one leaf per file 200. If the name of the file 200 is stored near the leaf level of the B-tree, then all the nodes on a path from that node up to the root node may need to be updated to reflect the changes of the node, hence the cascading updates and writes to storage.

For example, whenever the user updates the blog described above, the application also needs to update the file information that contains the blog, which cause at least one disk write. With more users, more disk writes take place.

The example embodiments are directed to an improved method and system for providing access to a new updated file without having to update system data structures, thereby minimizing or eliminating cascaded updates and excess disk writes in the system.

The example embodiments propose a new storage (e.g., SSD) command and API to handle this problem. That is, if a new version of a document may be accessed without updating the system data structure, then storage writes may be avoided or reduced significantly due to the elimination of the cascaded updates to reflect the up-to-date system information. Beyond this simplified example, many applications such as B-trees, document logging, shadow paging, double buffer writes, and others have such characteristics that the example embodiment may be applied to.

The example embodiments propose a command and an associated API referred to herein as a SWAT (SWap And Trim) command. Given a pair of logical page number lists, the SWAT command atomically swaps or remaps the mapping of LPNs in the lists in order and then trims the unused LPNs. A weak mapping concept is also introduced that allows concurrent processes to access the pages that are to be trimmed asynchronously until the pages are reclaimed by garbage collection.

Figure 3:
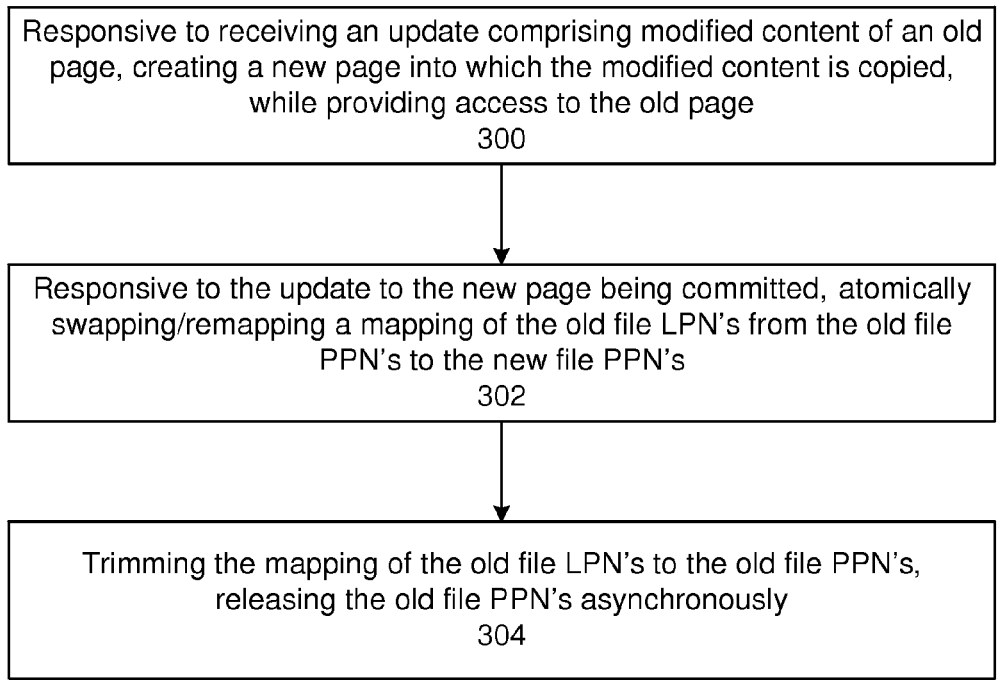
FIG. 3 is a flow diagram illustrating a process performed by the document management system for providing access to a file in during an update according to one example embodiment.
Figure 4:
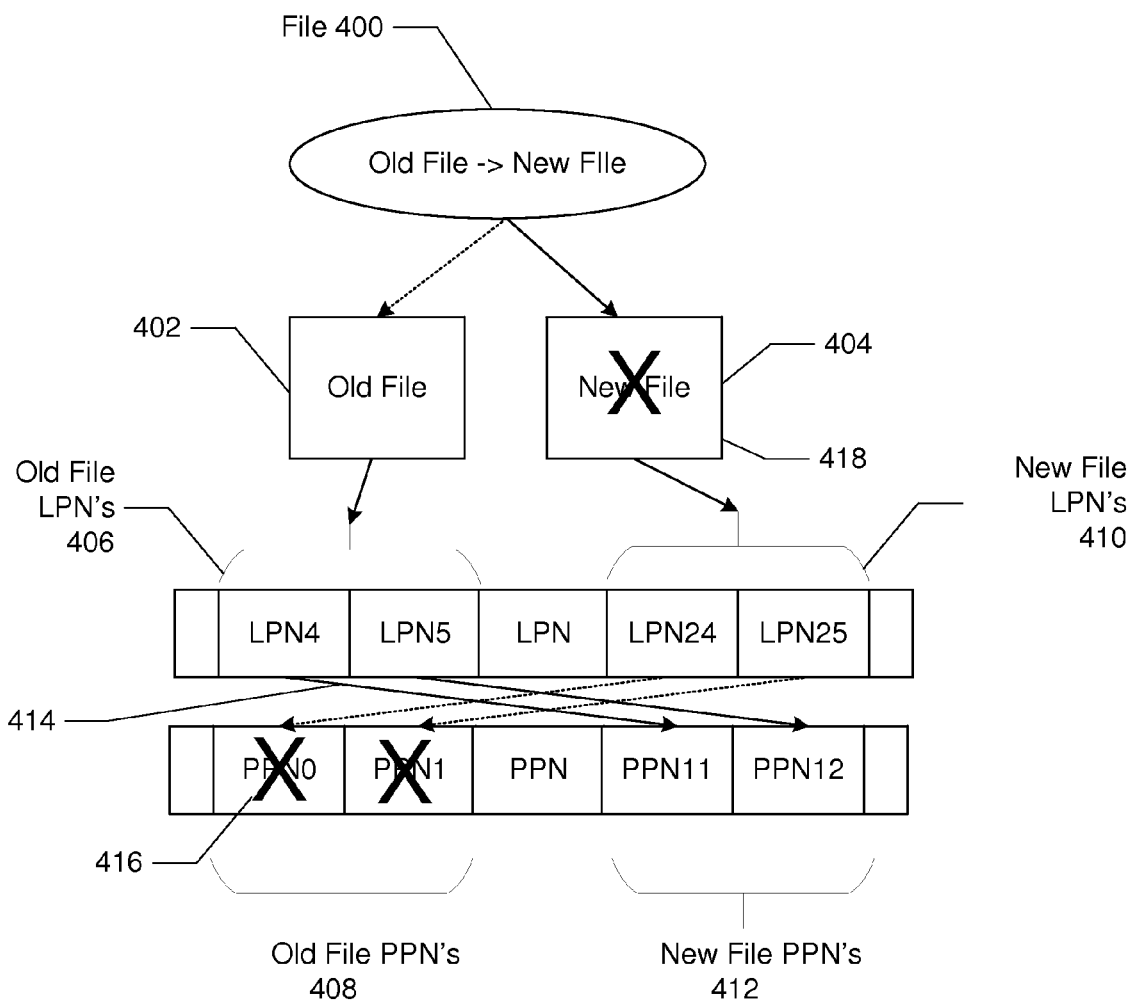
FIG. 4 is a diagram graphically illustrating the process shown in FIG. 3.

FIG. 3 is a flow diagram illustrating a process performed by the document management system 10 for providing access to a file during an update according to one example embodiment; and FIG. 4 is a diagram graphically illustrating the process.

With reference to FIGS. 1, 3 and 4, the process may begin responsive to receiving an update comprising modified base page(s) of an old file, to create a new file into which the modified content of a target page(s) is copied, while access to the old file is maintained (block 300).

This is illustrated in FIG. 4 showing that in response to a file 400 being updated, access to an old version of the file (i.e., old file) 402 is temporarily maintained and a new version of the file (i.e., new file) 404 is created containing modified target pages. The file 400 may be updated through one of the applications 20 or alternatively, through the operating system 22.

Prior to the SWAT operation, the file system 24 represents the logical storage location of the base pages for the old file 402 using a base list of old file LPNs 406 (e.g., LPN4-LPN5), while the high-speed storage 18 represents the physical storage location using a list of old file PPNs 408 (e.g., PPN0-PPN1). Similarly, the logical storage location of the pages for the new file 404 is also represented using a list of new file LPNs 410 (e.g., LPN24-LPN25), while the physical storage location in high-speed storage 18 is represented using a list of new file PPNs 412 (e.g. PPN11-PPN12).

Referring again to FIGS. 3 and 4, responsive to the update to the new file 404 being committed, a mapping of the old file LPNs 406 is atomically swapped/remapped from the old file PPNs 408 to the new file PPNs 412 (block 302). As shown in FIG. 4, the physical mapping of the list of old file LPNs 406 (i.e., LPN 4 and 5) is remapped to the list of new file PPNs 412 (i.e., PPN 11 and 12) of the new file 404. More specifically, once the SWAT command is issued, LPN4 is mapped to PPN11, and LPN5 is mapped to PPN12. Consequently, the SWAT API eliminates the need to update file information.

In addition, the mapping of the old file LPNs 406 to the old file PPNs 408 is trimmed asynchronously, releasing the old file PPNs 408 (block 304). As shown in FIG. 4, after the trimming the old file PPNs 408 (PPN0 and PPN1) are released as shown by the "X's" 416.

Once the SWAT command executes, the new file 404 maps to the old file's PPNs 408 (since it is no longer the actual "new file"). The new file 404 becomes volatile read-only, allowing users to read the content of its new physical page(s) (i.e., physical page(s) of the old file 402) until its new physical page(s) is recycled by garbage collection. This fuzzy-state mapping is referred to as a weak mapping, while a conventional mapping between a LPN and PPN is a strong mapping.

The following description and Figures illustrate how mapping tables can be updated when SWAT operations are applied to an SSD. This example uses two mapping tables: a Forward Mapping Table (FMT) and a Reverse Mapping Table (RMT). The mapping type is denoted as S (Strong) or W (Weak). The array representation of the forward mapping tables and reverse mapping tables is just for illustration. These can be implemented in different data structures such as arrays, lists, trees, hash maps, etc., based on the target performance, resource availability, etc.

A SWAT command swaps the mappings of two lists of LPNs on both the forward mapping table (FMT) and the reverse mapping table (RMT) in an atomic way, making the mappings for the target WEAK. The weak mappings are removed at least when a garbage collection occurs. An example is illustrated in the Figures below.

Figure 5:
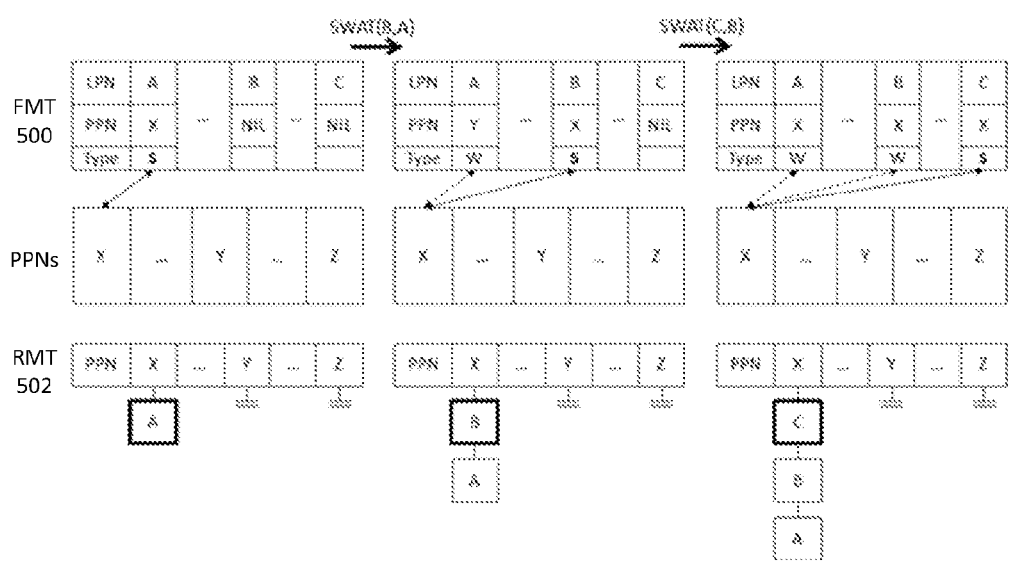
FIGS. 5-12 are diagrams showing various states of a Forward Mapping Table (FMT), a list of PPNs and a Reverse Mapping Table (RMT).

FIGS. 5-12 are diagrams showing various states of a Forward Mapping Table (FMT), a list of PPNs and a Reverse Mapping Table (RMT). As shown in FIG. 5, the FMT 500 can include an LPN row listing LPNs, a PPN row listing PPN's, and a mapping type row containing a value for strong (S) or weak (W) mappings between the LPN and the PPN of the same column. The example of FIG. 5 assumes that the FMT 500 contains entries showing that LPN_A and PPN_X have a strong mapping. The example further assumes that a SWAT command has been issued for LPN_A and LPN_B, followed by a SWAT command for LPN_B and LPN_C. The first SWAT command results in updates to the forward mapping information in the FMT 500 of LPN_A to PPN_Y and that of LPN_B to PPN_X. The SWAT command also results in updates to reverse mapping information in the RMT 502 of PPN_X to LPN_B and to LPN_A. The resulting mapping between LPN_B and PPN_X is strong as indicated by the entry for LPN_B in the RMT 502 being bold, while the mapping between LPN_A and PPN_X is weak as indicated by the non-bolded entry for LPN_A in the RMT 502. The weak mappings may be removed immediately or at garbage collection time.

One of the following events can remove a weak mapping: 1) garbage collection, 2) a write command, 3) a trim command, or 4) another SWAT command.

Figure 6:
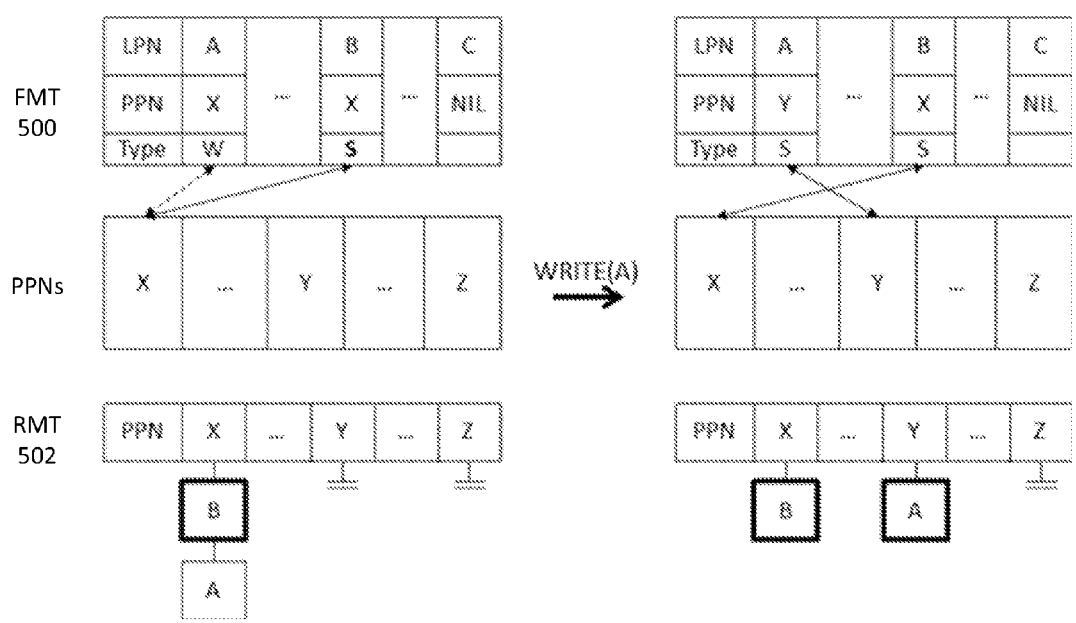

A write to an LPN with a weak mapping can create a strong mapping to a new PPN, and can remove the weak mapping. For example, as illustrated in FIG. 6, a write to LPN_A, via a Write(A) command, allocates a new PPN_Y, and updates the forward mapping of LPN_A in the FMT 500 to PPN_Y. In parallel, the RMT 502 is updated to remove the weak mapping for LPN_A from the reverse map list of PPN_X and adds a new reverse mapping for LPN_A to the reverse map list of PPN_Y.

Figure 7:
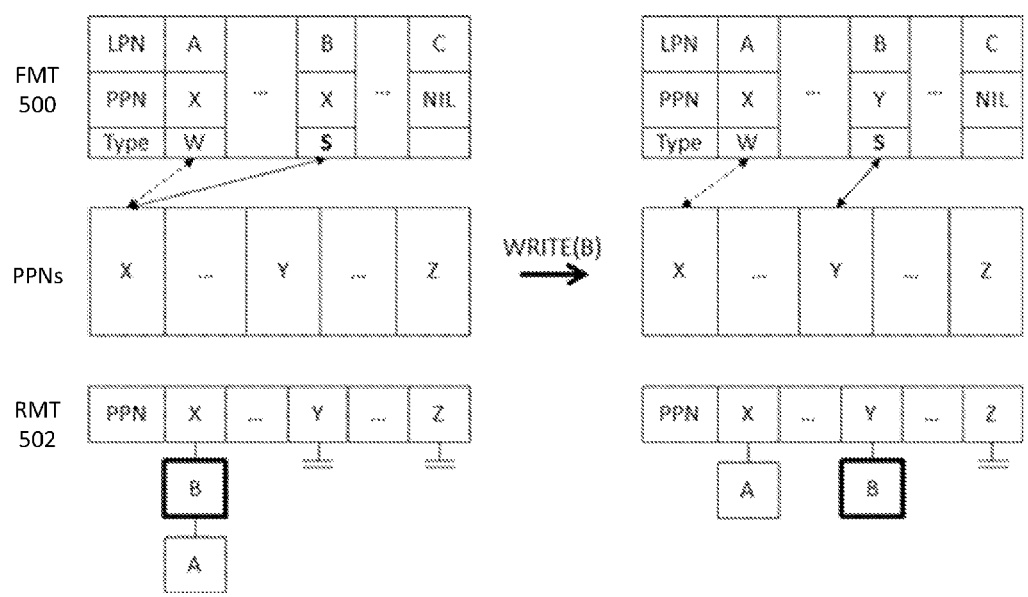

A write to an LPN with a strong mapping to a PPN can create a strong mapping to a new PPN, and can remove all weak mappings to the old PPN. For example, as illustrated in FIG. 7, a write to LPN_B, via a Write(B) command, allocates a new PPN_Y, and updates the forward mapping of LPN_B in the FMT 500 to PPN_Y. This makes the weak mapping of LPN_A stale and this mapping is can be removed immediately or at garbage collection time. In parallel, the RMT 502 is updated to remove the entry for LPN_B from the reverse map list of PPN_X and adds a new entry for LPN_B to the reverse map list of PPN_Y while the entry for LPN_A may also removed from the list of PPN_X immediately or at garbage collection time.

Figure 8:
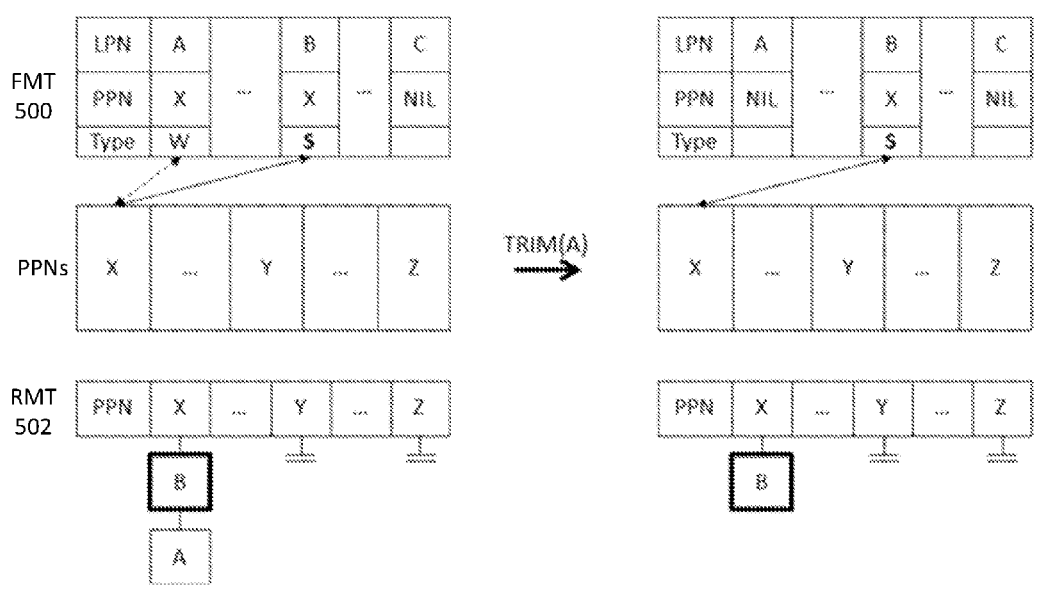

A TRIM against an LPN with a weak mapping can remove the weak mapping immediately. For example, as illustrated in FIG. 8, a TRIM to LPN_A, via a Trim(A) command, removes the forward mapping of LPN_A to PPN_X. In parallel, the RMT 502 is updated to remove the entry for LPN_A from the reverse map list of PPN_X.

Figure 9:
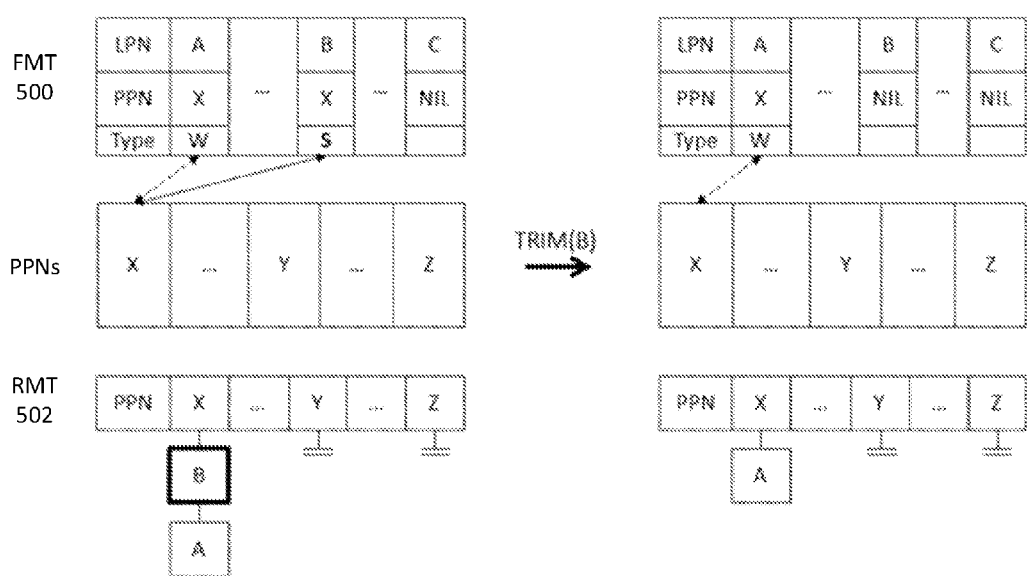

A TRIM against an LPN with a strong mapping to a PPN can remove all mappings to the PPN. For example, as illustrated in FIG. 9, a TRIM to LPN_B removes the forward mapping of LPN_B. This makes the weak mapping of LPN_A stale and this mapping may be removed immediately or at garbage collection time. In parallel, the RMT 502 is updated to remove the entry for LPN_B from the reverse map list of PPN_X and the entry for LPN_A may also be removed from the reverse map list of PPN_X immediately or at garbage collection time.

Figure 10:
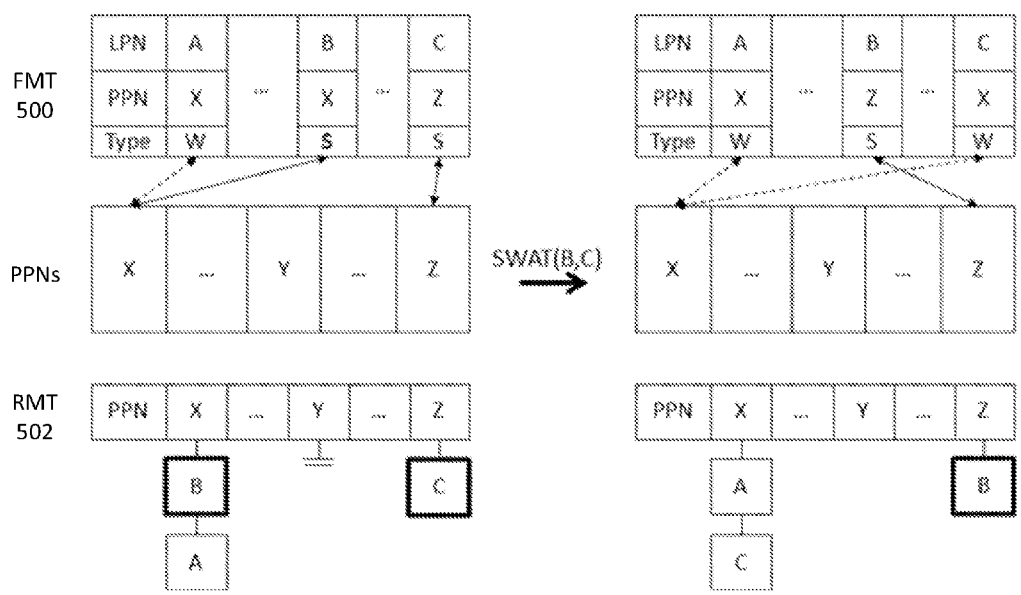

A SWAT with a LPN, as the base LPN, having a strong mapping to a PPN that also has weak mappings can remove all the weak mappings to the PPN. For example, as illustrated in FIG. 10, a SWAT with LPN_B as the base and LPN_C as the target makes the forward mapping entry of LPN_C to PPN_X weak. Since PPN_X only has weak mappings, the weak mappings may consequently be removed, immediately or at garbage collection time. In parallel, this adds an entry for LPN_C to the reverse map list of PPN_X in the RMT 502. All weak mappings of PPN_X in the RMT 502 may be removed immediately or at garbage collection time.

Figure 11:
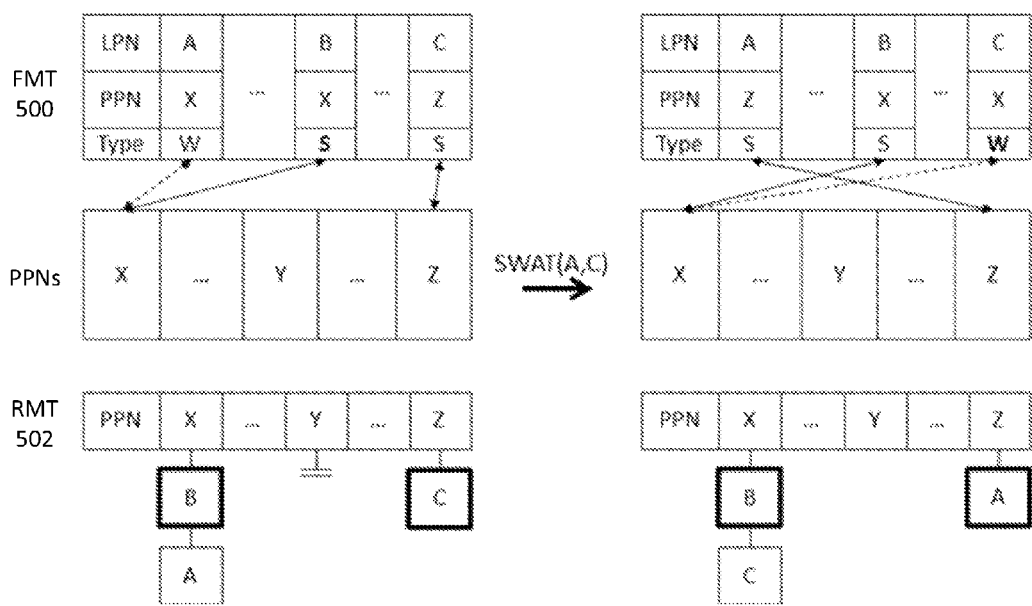

A SWAT with a LPN, as the base LPN, having a weak mapping to a PPN that also has strong mapping to another LPN can remove the weak mapping of the LPN. Since the weak mapping is not stale, this weak mapping is treated like a strong mapping. For example, as illustrated in FIG. 11, a SWAT with LPN_A as the base and LPN_C as the target removes the weak mapping of LPN_A from the FMT 500 and creates a strong mapping to PPN_Z. This makes the mapping of LPN_C to PPN_X weak and consequently PPN_X has both a strong mapping and a weak mapping. In parallel, the RMT 502 is updated to add a weak mapping entry for LPN_C to the reverse map list of PPN_X and a strong mapping entry for LPN_A to the reverse map list of PPN_Z.

Figure 12:
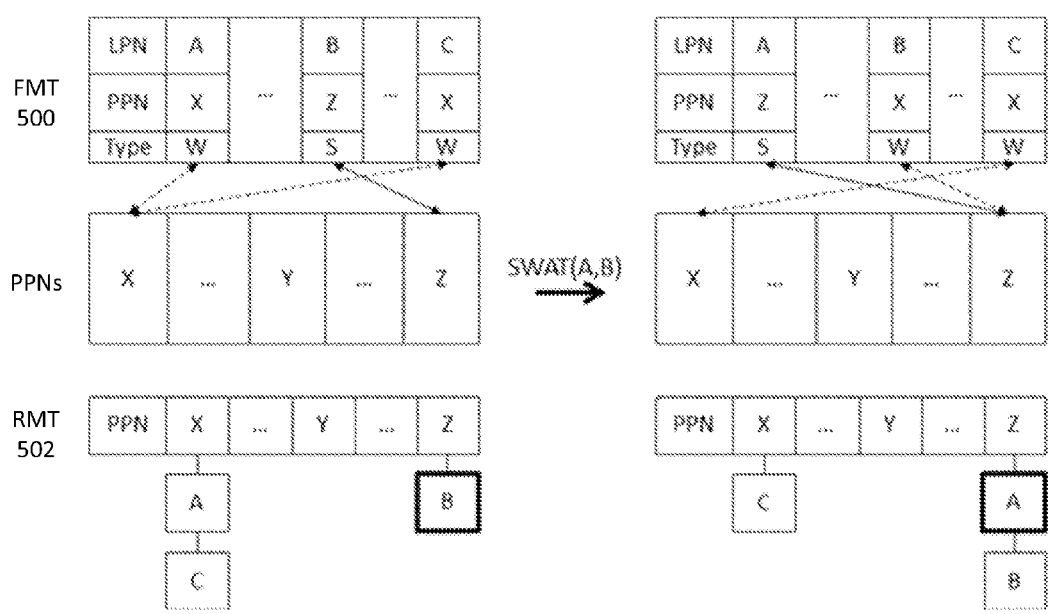

A SWAT with a LPN, as the base LPN, having a weak mapping to a PPN that also has a weak mapping to another LPN can remove the weak mapping of the LPN. Since the weak mapping is stale, this weak mapping is treated like a no-mapping. For example, as illustrated in FIG. 12, a SWAT with LPN_A as the base and LPN_B as the target removes the weak mapping of LPN_A from the FMT 500 and creates a strong mapping from LPN_A to PPN_Z. This makes both LPN_A and LPN_B share PPN_Z and consequently PPN_Z has both a strong mapping and a weak mapping. In parallel, the RMT 502 is updated to add a strong mapping entry for LPN_A and a weak mapping entry for LPN_B to the reverse map list of PPN_Z.

If garbage collection or a trim command removes a weak mapping, the LPN becomes invalid and a read for the logical page returns a predefined value such as 0xFF. A write operation against a logical page having a weak mapping allocates a new physical page and creates a strong PPN mapping. If a base page is presently unused (i.e., has no physical page mapping), the target page keeps its current mapping but the mapping becomes a weak mapping. A SWAT command works with a logical page that has a strong mapping, a weak mapping, or no mapping. An LPN for the base can be any of the three while an LPN for the target has a strong mapping. When the base LPN has a weak mapping, it is considered as no mapping. A physical page can have, at maximum, Nweak mappings (default N=1). More details are provided below.

For example, in FIG. 4 the SWAT command operates against two lists, a base list of LPNs (e.g., LPN4-LPN5) and a target list of LPNs (e.g., LPN24-LPN25), each of which in this example includes two pages. In this example, LPN4 and LPN5 are in the base list and originally have strong mappings to PPN0 and PPN1, respectively, while LPN24 and LPN25 are in the target list and originally have strong mappings to PPN11 and PPN12, respectively. Executing the SWAT command with these two lists creates a strong mapping between LPN4 and PPN11 and another strong mapping between LPN5 and PPN12, while creating a weak mapping between LPN24 and PPN0 and another weak mapping between LPN25 and PPN1 (shown by the dashed arrows).

A physical page is eligible for garage collection when the physical page has no strong mapping to any LPN. Completing a SWAT command operation creates a weak mapping for LPNs in the target list. As a result, garbage collection eventually reclaims both PPN0 and PPN1, completely removing the weak LPN24 and LPN25 mappings. The logical pages (e.g., LPN24-LPN25) are readable before a garbage collection takes place. If the logical page is written, the weak mapping is removed and a strong mapping to a new physical page is created. Mapping changes are atomic.

Figure 13:
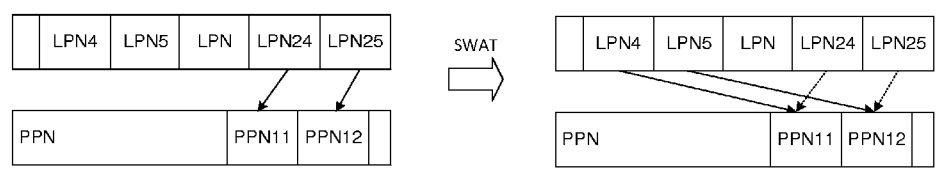
FIG. 13 illustrates a SWAT command example for unused pages.

FIG. 13 illustrates a SWAT command example for unused pages. In this figure, LPN4 and LPN5 (in the base list) are unused (empty) logical pages, while LPN24 and LPN25 (in the target list) have strong mappings to PPN11 and PPN12. As in the example above, completing a SWAT command for these two lists creates a strong mapping between LPN4 and PPN11 and another strong mapping between LPN5 and PPN12. Although LPN24 and LPN25 keep their original mappings because LPN4 and LPN5 are unused, the mapping strength is changed from "strong" to "weak" to indicate this is a SWAT operation result.

Figure 14:
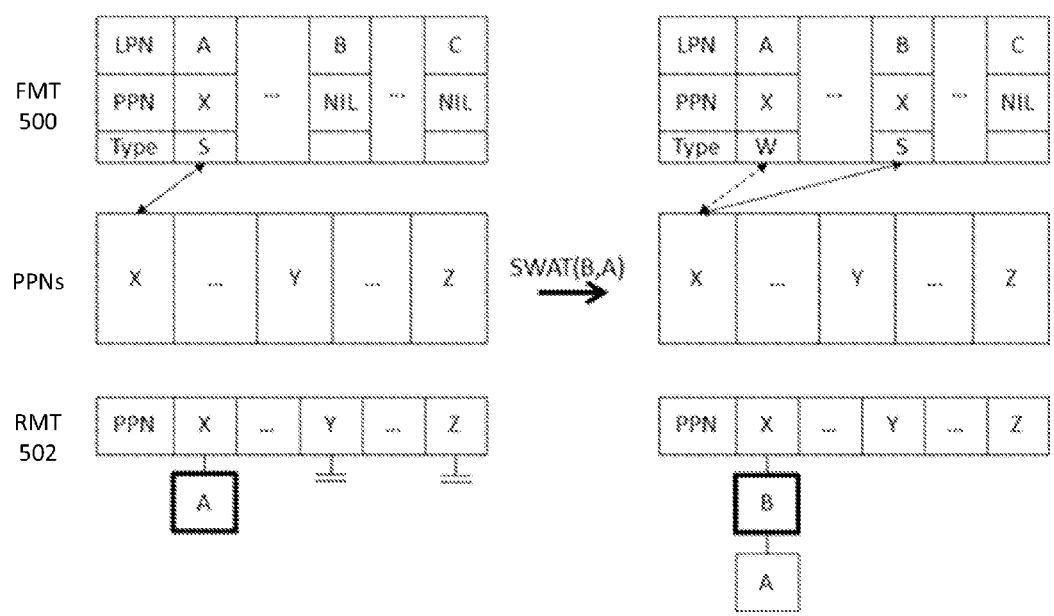
FIG. 14 illustrates a SWAT command example for a base LPN having no mapping.

A SWAT with a LPN, as the base LPN, having no mapping can create a new valid weak mappings for the LPN. For example, as illustrated in FIG. 14, a SWAT with LPN_A as the base and LPN_B as the target creates a new weak mapping of LPN_A to PPN_X in the FMT 500. This makes both LPN_A and LPN_B share PPN_X and consequently PPN_X has both a strong mapping and a weak mapping. In parallel, the RMT is updated to add a strong mapping entry for LPN_B and a weak mapping entry for LPN_A to the reverse map list of PPN_X.

A physical page is eligible for garage collection when it has no strong LPN mapping. Therefore, such shared physical pages survive garbage collection because strong mappings exist for PPN11 and PPN12. As a result, LPN24 and LPN25 can be used to access PPN11 and PPN12, respectively, as long as neither condition below is satisfied: 1) the strong LPN4 and LPN5 mappings are removed, or 2) garbage collection has recycled the pages.

If garbage collection relocates a shared physical page, both strong and weak mappings must migrate accordingly.

Figure 15:
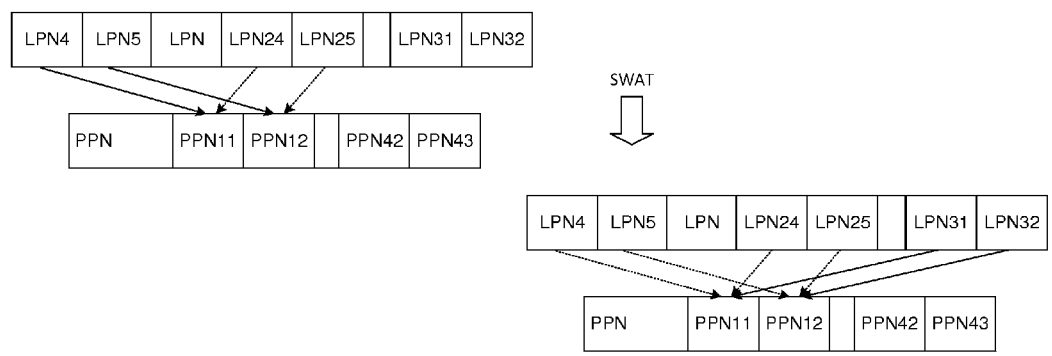
FIG. 15 illustrates an example of repeated SWAT commands.

FIG. 15 illustrates an example of repeated SWAT commands. If repeated SWAT operations occur as shown, a physical page (e.g., PPN11) can have multiple, different weak LPN mappings (e.g., LPN4 and LPN24). By default, a physical page can have one strong mapping (e.g., LPN31 to PPN11) and one optional weak mapping. But the maximum number, defined by a predefined parameter that one physical page can support is implementation-dependent.

According to the example embodiments, the SWAT command and API provide several advantages over existing techniques. The swap command does not require any modification to the OS, and may be applied to all types of SSD devices with a minor firmware modification. The SWAT command may also improve the endurance of SSD devices significantly by reducing the number of disk writes from the applications. The SWAT command may also improve the performance of the system by proactively reclaiming unused space. In addition, the SWAT command may deliver significant performance benefits of applications, especially with multi-version concurrency control.

The following describes some embodiments of the SWAT command in further detail. Once the file is committed through the application 20, either the operating system 22 or the file system 24 makes a call to the device driver API 26. The device driver API 26 may then issue the SWAT command to the high-speed storage 18.

In one embodiment, the command may specify a pair of LPN lists—a target list of new file LPNs 410 and a base list of old file LPNs 406. The Flash translation layer (FTL) 34 in the high-speed storage 18 may receive the list of old file LPNs 406 and the list of new file LPNs 410 and atomically remap the mapping of LPNs in the pair of LPN lists in the order specified. As stated above, in one embodiment the SWAT command is atomic.

The SWAT command can be implemented in any type of storage protocol such as SATA, SAS, PCIe, eMMC, UFS, and the like through a vendor specific command. Aspects and embodiments of the SWAT commands will be better understood with reference to the following API pseudo-code in which the invention is described in terms of specific embodiments. This pseudo-code is not meant to represent any particular coding language, or even to be compiled, simply to express in more formal terms the operation of the system. These are provided for purposes of clarity and should not be taken to limit the invention. The invention and aspects thereof may have applications to a variety of types of methods, devices, and code not specifically disclosed herein.

SWAT API

```
#define SI_LBA_PER_PAGE           16   // 8KB page
#define SI_MAX_SWAT_PAGE               64   // 64 pages
#define SI_MAX_WEAK_MAPPING    1    //   maximum number of weak mappings
#define SI_MAP_STRONG        1
#define SI_MAP_WEAK          2
/*
* DESCRIPTION
*    See SWAT command for details
* PARAMETER
*      base_page: the start LPN of base page(s); base_page(s) are
* strongly mapped to the PPN(s) of target page(s), if LPN is not
* within the range of device, SI_ERROR_INVALID_PAGE is returned
*      target_page: the start LPN number of target page(s);
* target_page(s) are weakly mapped to the PPN(s) of
* base_page(s),if LPN is not within the range of device,
* SI_ERROR_INVALID_PAGE is returned
* taget_page must have strong mapping(s), otherwise return
* SI_ERROR_VOLATILE_PAGE
*      page_cnt : # of contiguous LPNs to be SWATed; the maximum
* number of LPNs is defined as SI_MAX_SWAT_PAGE, if this is
* larger than SI_MAX_SWAT_PAGE, operation fails and
* SI_ERROR_MAX_SWAT_PAGE is returned
*
* RETURN
*    SI_SUCCESS: SWAT operation is done successfully
*    SI_ERROR_INVALID_PAGE: LPN value is not valid (out of range
*of device)
*    SI_ERROR_VOLATILE_PAGE: a logical page that has only a weak
* mapping cannot be used
*    SI_ERROR_OVERLAP_PAGE: the LPN range of base_page and
* target_page is overlapped
*    SI_ERROR_MAX_SWAT_PAGE: the number of logical pages exceeds
* SI_MAX_SWAT_PAGE
*    SI_ERROR_ATOMIC: an error occurs during the operation so
* all changes are rolled back
*    SI_ERROR_MAX_WEAK_MAPPING: the number of weak mappings for
* a physical page exceeds the SI_MAX_ WEAK_MAPPING
*/
SI_ERROR si_swat (SI_PAGE base_page, SI_PAGE target_page,
SI_PAGE_COUNT page_cnt)
{
  // the number of pages must be smaller than SI_MAX_SWAT_PAGE
  if page_cnt > SI_MAX_SWAT_PAGE
    return SI_ERROR_MAX_SWAT_PAGE;
  // the page range of base and target must be valid
  if !isValid(base_page, page_cnt) or !isValid(target_page,
page_cnt)
    return SI_ERROR_INVALID_PAGE;
  // two ranges must not be overlapped
  if isOverlapped(base_page, target_page, page_cnt)
    return SI_ERROR_OVERLAP_PAGE;
  // target range must not have any weak mappings
  // any weak mappings in the base range are trimmed, though
  if hasWeakMapping(target_page, page_cnt)
    return SI_ERROR_VALATILE_PAGE;
  for i = 0 to page_cnt − 1
    // swap reverse mapping table entries
    if forward_map_table[base_page+i] is not NIL
       removeRMT(reverse_map_table,
forward_map_table[base_page+i], base_page+i);
```

| SWAT API |
|---|

```
    removeRMT(reverse_map_table,
forward_map_table[target_page+i], target_page+i);
    addRMT(reverse_map_table,
forward_map_table[target_page+i], base_page+i, SI_MAP_STRONG);
    if forward_map_table[base_page+i] has a strong mapping
or
        reverse_map_table[forward_map_table[base_page+i]] has
a strong mapping
        addRMT(reverse_map_table,
forward_map_table[base_page+i], target_page+i, SI_MAP_WEAK);
    else
        addRMT(reverse_map_table,
forward_map_table[target_page+i], target_page+i, SI_MAP_WEAK);
    // swap forward mapping table entries
    if forward_map_table[base_page+i] is not NIL
        tmp = forward_map_table[base_page+i];
    else
        tmp = forward_map_table[target_page+i];
    setFMT(forward_map_table, base_page+i,
forward_map_table[target_page+i], SI_MAP_STRONG);
    setFMT(forward_map_table, target_page+i, tmp,
SI_MAP_WEAK);
    return SI_SUCCESS;
}
RemoveRMT(reverse_map_table, ppn, lpn)
{
    Remove the entry for lpn from the reverse list for ppn in
the reverse_map_table
}
addRMT(reverse_map_table, ppn, lpn, mapping_type)
{
    Add lpn to the list for ppn in the reverse_map_table &
    set the type of the mapping
}
setFMT(forward_map_table, lpn, ppn, type)
{
    Map lpn to ppn in the forward_map_table &
    set the type of the mapping
}
Example 1)
// swat a page starting from 0 with one starting from 100,
// the page of LPN 0 is mapped to the physical page of LPN 100
If (si_swat(0, 100, 1) != SI_SUCCESS) {
// error
}
Example 2)
// swat an extent starting from 0 with one starting from 100,
// the extent of LPN 0 is mapped to the physical pages of the
extent of LPN 1000
If (si_swat(0, 1000, SI_MAX_SWAT_PAGE) != SI_SUCCESS) {
// error;
}
typedef struct _si_extent {
SI_PAGE lpn;
SI_PAGE_COUNT count;
} si_extent;
/*
* PARAMETER
*    base_page: an array of (LPN, page_count) pairs,
* base_extent(s) are strongly mapped to the physical pages for
* target_extent(s); if any LPN is not within the range of
* device, SI_ERROR_INVALID_LBA is returned
*    base_cnt: # of extents, the maximum number of pages is
*defined as SI_MAX_SWAT_PAGE, if the total number of pages in
*the list is larger than SI_MAX_SWAT_PAGE,
*SI_ERROR_MAX_SWAT_PAGE is returned
*      subsitute_page: an array of (LPN, page_count) pairs,
* target_page(s) are weakly mapped to the physical pages for
* base_extent(s), if any LPN is not within the range of device,
* SI_ERROR_INVALID_LBA is returned
*    target_cnt: # of extents, the maximum number of pages is
* defined as SI_MAX_SWAT_PAGE, if the total number of pages in
* the list is larger thanSI_MAX_SWAT_PAGE, SI_ERROR_MAX_SWAT_PAGE
* is returned
* RETURN
*    SI_SUCCESS: SWAT operation is done successfully
*    SI_ERROR_EXTENT_MISMATCH: the number of page count in
```

-continued

```
                              SWAT API

* extent is not matched
*    SI_ERROR_INVALID_PAGE: LPN value is not valid (out of range
* of device)
*    SI_ERROR_VOLATILE_PAGE: a logical page that has only a weak
* mapping cannot be used
*    SI_ERROR_OVERLAP_PAGE: the LPN range of base_page and
target_page is overlapped
*    SI_ERROR_MAX_SWAT_PAGE: the total number of logical pages
* in the list exceeds SI_MAX_SWAT_PAGE
*    SI_ERROR_ATOMIC: an error occurs during the swap operation
* so all changes are rolled back
*    SI_ERROR_MAX_WEAK_MAPPING: the number of weak mappings for
* a physical page exceeds the SI_MAX_ WEAK_MAPPING
*/
SI_ERROR si_swat_extent (si_extent **base_extents,
SI_EXTENT_COUNT
base_cnt, si_extent **target_extents,
SI_EXTENT_COUNT target_cnt);
Example 3)
si_extent base_extents[3] = {
{0, 1},
{2, 2},
{4, 7}
};
si_extent target_extents[2] = {
{100, 2},
{110, 8}
};
// total number of pages to be swat is equal
if (si_swat_extent(&base_extents, 3, &target_extents, 2) !=
SI_SUCCESS) {
// error;
}
```

The present invention has been described in accordance with the embodiments shown, and there could be variations to the embodiments, and any variations would be within the spirit and scope of the present invention. For example, the example embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

I claim:

1. A method of providing access to an updated file in a document management system comprising a storage device coupled to an external processor, wherein a file translation layer (FTL) map is maintained by an FTL between logical page numbers (LPNs) maintained by a file system and physical page numbers (PPNs) maintained by the storage device, the method comprising:

receiving by the storage device a first command from the processor, the first command sent responsive to an application receiving an update comprising modified content of a first file and creation of a second file into which the modified content is copied, while access to the first file is maintained, wherein parameters of the first command includes, a first list of LPNs corresponding to the first file, and a second list of LPNs corresponding to the second file, and wherein the first list of LPNs is mapped to a first list of PPNs representing storage locations of the first file on the storage device, and the second list of LPNs is mapped to a second list of PPNs representing storage locations of the second file on the storage device;

atomically remapping the first list of LPNs so that the first list of LPNs is mapped to the second list of PPNs in order, wherein for each LPN of the first list of LPNs, a mapping is created in the FTL map between a LPN of the first list of LPNs and a corresponding PPN of the second list of PPNs;

trimming a mapping of the first list of LPNs to the first list of PPNs asynchronously, wherein for every LPN of the first list of LPNs, a mapping is removed in the FTL map between a LPN of the first list of LPNs and a corresponding PPN of the first list of PPNs; and unmapping a mapping of the second list of LPNs to the second list of PPNs, wherein for every LPN of the second list of LPNs, a mapping is removed in the FTL map between a LPN of the second list of LPNs and a corresponding PPN of the second list of PPNs.

2. The method of claim 1, wherein the first command comprises a swap and trim (SWAT) command and is issued to an application programming interface (API).

3. The method of claim 2, wherein the SWAT command is issued from a storage device driver API to the storage device in response to a call made by an application or an operating system.

4. The method of claim 2, wherein LPNs in the first list of LPNs and the second lists of LPNs are atomically remapped in an order specified by the first list of LPNs and the second list of LPNs.

5. The method of claim 4, further comprises providing weak mapping that allows concurrent processes to access pages that are to be trimmed asynchronously until the pages are reclaimed by garbage collection.

6. The method of claim 5, further comprises removing the weak mapping by garbage collection, a write command, or a trim command.

7. A system, wherein a file translation layer (FTL) map is maintained by an FTL between logical page numbers (LPNs) maintained by a file system and physical page numbers (PPNs) maintained by a storage device, the system comprising:
   a computer comprising a processor and a memory; and
   the storage device external to the processor and the memory;
   wherein the storage device is configured to:
      receive a first command from the processor, the first command sent responsive to an application receiving an update comprising modified content of a first file and creation of a second file into which the modified content is copied, while access to the first file is maintained, wherein parameters of the first command include a first list of LPNs corresponding to the first file, and a second list of LPNs corresponding to the second file, wherein the first list of LPNs is mapped to a first list of PPNs representing storage locations of the first file on the storage device, and the second list of LPNs is mapped to a second list of PPNs representing storage locations of the second file on the storage device;
      atomically remap the first list of LPNs so that the first list of LPNs is mapped to the second list of PPNs in order, wherein for each LPN of the first list of LPNs, a mapping is created in the FTL map between a LPN of the first list of LPNs and a corresponding PPN of the second list of PPNs;
      trim a mapping of the first list of LPNs to the first list of PPNs asynchronously, wherein for every LPN of the first list of LPNs, a mapping is removed in the FTL map between a LPN of the first list of LPNs and a corresponding PPN of the first list of PPNs; and
      unmap the mapping of the second list of LPNs to the second list of PPNs, wherein for every LPN of the second list of LPNs, a mapping is removed in the FTL map between a LPN of the second list of LPNs and a corresponding PPN of the second list of PPNs.

8. The system of claim 7, wherein the first command comprises a swap and trim (SWAT) command and is issued through an application programming interface (API).

9. The system of claim 8, wherein LPNs in the first and second lists of LPNs are atomically remapped in an order specified by the first list of LPNs and the second lists of LPNs.

10. The system of claim 7, wherein the SWAT command is issued from a storage device driver API to the storage device in response to a call made by an application or an operating system.

11. The system of claim 7, wherein weak mapping is provided that allows concurrent processes to access pages that are to be trimmed asynchronously until the pages are reclaimed by garbage collection.

12. The method of claim 11, wherein the weak mapping is removed by garbage collection, a write command, or a trim command.

13. An executable software product stored on a non-transitory computer-readable medium containing program instructions for providing access to an updated file in a document management system comprising a storage device coupled to an external processor, wherein a file translation layer (FTL) map is maintained by an FTL between logical page numbers (LPNs) maintained by a file system and physical page numbers (PPNs) maintained by the storage device, the program instructions for:
   receiving by the storage device a first command from the processor, the first command sent responsive to an application receiving an update comprising modified content of a first file and creation of a second file into which the modified content is copied, while access to the first file is maintained, wherein parameters of the first command include a first list of LPNs corresponding to the first file and a second list of LPNs corresponding to the second file, wherein the first list of LPNs is mapped to a first list of PPNs representing storage locations of the first file on the storage device, and the second list of LPNs is mapped to a second list of PPNs representing storage locations of the second file on the storage device;
   atomically remapping the first list of LPNs so that the first list of LPNs is mapped to the second list of PPNs in order, wherein for each LPN of the first list of LPNs, a mapping is created in the FTL map between a LPN of the first list of LPNs and a corresponding PPN of the second list of PPNs;
   trimming a mapping of the first list of LPNs to the first list of PPNs asynchronously, wherein for every LPN of the first list of LPNs, a mapping is removed in the FTL map between a LPN of the first list of LPNs and a corresponding PPN of the first list of PPNs; and unmapping a mapping of the second list of LPNs to the second list of PPNs, wherein for every LPN of the second list of LPNs, a mapping is removed in the FTL map between a LPN of the second list of LPNs and a corresponding PPN of the second list of PPNs.

14. A method of providing access to an updated file performed by a storage device coupled to an external computer having at least one processor, wherein a file translation layer (FTL) map is maintained by an FTL between logical page numbers (LPNs) maintained by a file system and physical page numbers (PPNs) maintained by the storage device, comprising:
   receiving a first command from the processor, the first command sent responsive to an application receiving an update comprising modified content of a first file and creation of a second file into which the modified content is copied, while access to the first file is maintained, wherein parameters of the first command include a first list of LPNs corresponding to the first file, and a second list of LPNs corresponding to the second file, wherein the first list of LPNs is mapped to a first list of PPNs representing storage locations of the first file on the storage device, and the second list of LPNs is mapped to a second list of PPNs representing storage locations of the second file on the storage device;
   atomically remapping the first list of LPNs for the first file so that the first list of LPNs is mapped to the second list of PPNs for the second file in order, wherein for each LPN of the first list of LPNs, a mapping is created in the FTL map between a LPN of the first list of LPNs and a corresponding PPN of the second list of PPNs;
   trimming a mapping of the first list of PPNs for the first file asynchronously, wherein for every LPN of the first list of LPNs, a mapping is removed in the FTL map between a LPN of the first list of LPNs and a corresponding PPN of the first list of PPNs; and unmapping a mapping of the second list of LPNs to the second list of PPNs, wherein for every LPN of the second list of LPNs, a mapping is removed in the FTL map between a LPN of the second list of LPNs and a corresponding PPN of the second list of PPNs.

\* \* \* \* \*